2 Sheets--Sheet 1.

A. WARD.

Body-Bolsters for Railroad Cars.

No. 5,560. Reissued September 2, 1873.

WITNESSES.

Boyd Eliot

E. V. Eliot

Ambrose Ward

INVENTOR.

2 Sheets--Sheet 2.

A. WARD.

Body-Bolsters for Railroad Cars.

No. 5,560. Reissued September 2, 1873.

WITNESSES

Roy Eliot
E. N. Eliot

Andrew Ward

INVENTOR.

UNITED STATES PATENT OFFICE.

AMBROSE WARD, OF ALTOONA, PENNSYLVANIA.

IMPROVEMENT IN BODY-BOLSTERS FOR RAILROAD-CARS.

Specification forming part of Letters Patent No. 24,512, dated June 21, 1859; extended seven years; reissue No. 5,560, dated September 2, 1873; application filed July 2, 1873.

*To all whom it may concern:*

Be it known that I, AMBROSE WARD, of Altoona, in the State of Pennsylvania, have invented certain Improvements in Body-Bolsters for Railroad-Cars, of which the following is a specification:

The object of this invention is, first, to provide a means of preventing the sagging of the body-bolsters of railroad-cars from their center plates down to their side bearings; and it consists in the combination with said bolsters of suitable trusses, a tension rod or rods, and center plates, so constructed and combined that the weight of the car resting thereon will be at all times supported on the center plates of the truck in such manner as to allow the truck to follow easily the curves of the road, as will be hereinafter explained. The second object of the invention is to keep the center plates between the bolsters and the trucks in a good working condition at all times; and consists in providing the bearing-plate with concentric flanges, which form an oil-receptacle between them, the other bearing-plate having a flange, which forms a bearing-surface for the body-bolster, all as fully hereinafter described.

Figure 1:
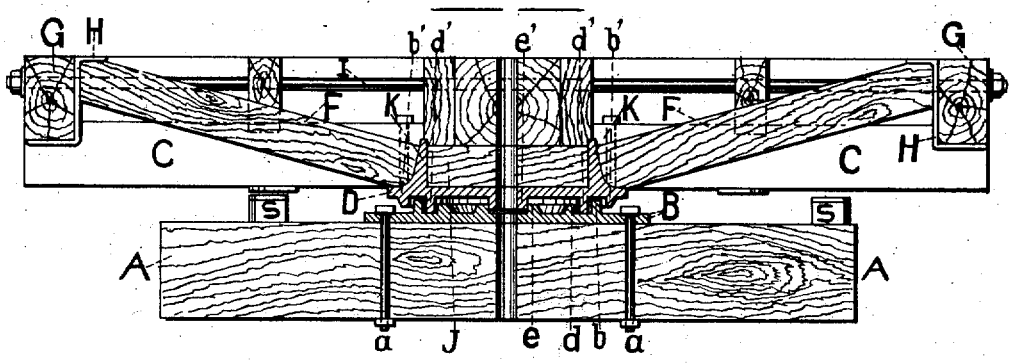
Figure 2:
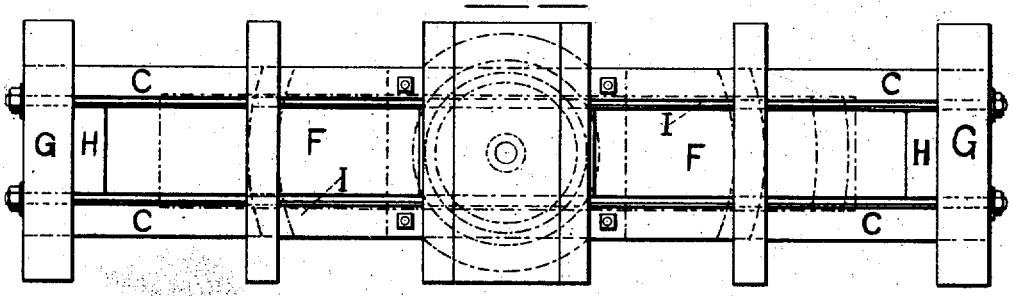
Figure 3:
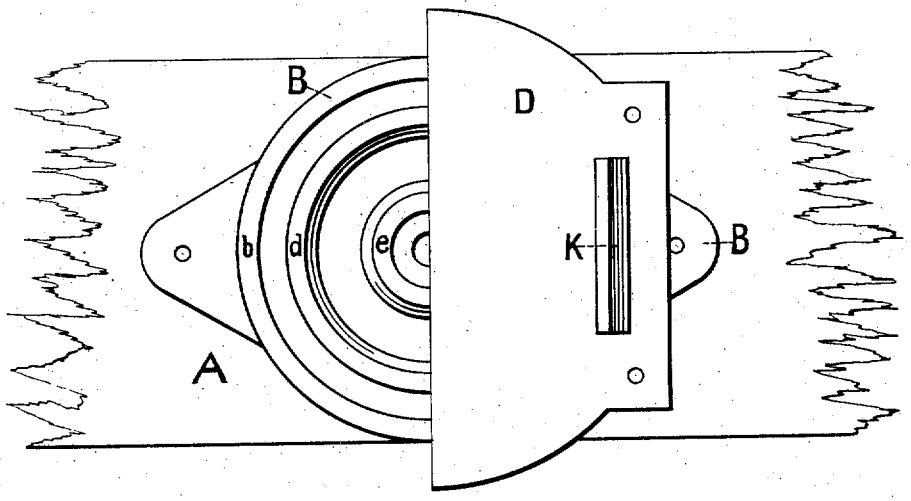
Figure 4:
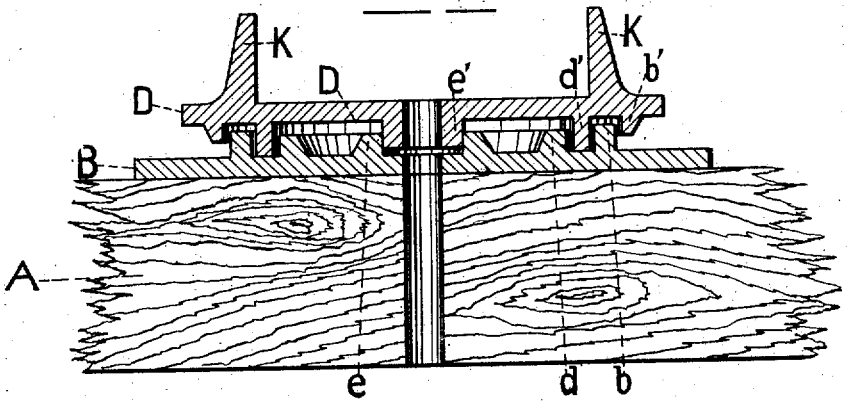

Figure 1 is a sectional view through the center of the truss, body-bolster, center plate, and truck-bolster of a car, and made transversely with the length of the car. Fig. 2 is a top view of the same. Fig. 3 is a top view of a portion of the center plates. Fig. 4 is a sectional view of the same.

At A is represented the truck-bolster, upon the upper surface of which is shown its bearing or center plate B. At C is shown the body-bolster, with its bearing or center plate D. At F F are seen the trusses or braces, which abut against the inner faces of the outside sills G of the car, and extend therefrom down to the upper center plate D, and against a bracket thereon, which is shown at K. To preserve the ends of the trusses from crushing into the sides of the sills at G, angle-irons may be used, as shown at H, Fig. 1, which may reach from under the sill up along the inner face thereof, and up to the floor of the car, and there turn inward a short distance to form an angle to receive the upper ends of the trusses, and thereby form a metal surface to protect the sills. Said angle-irons may be dispensed with when the sills are made of hard and well-seasoned lumber. To prevent the sills from spreading under the downward action upon the trusses, a tension rod or rods, as at I, provided with screw-nuts at one or both ends, extend across through the outer sills G, as chords to the trusses of a bent in any frame-work, and thereby binds the trusses and the sills together, and by the tightening of which any looseness from shrinkage of the wood may be readily compensated for. To assist the brackets at K in resisting the end thrust of the trusses, the space between the two brackets is filled with a wooden stud, as shown at J. The bearing-plates B and D are made of cast-iron, and are attached upon their respective bolsters in any convenient manner, as by screw-bolts shown at *a a*. They are also made of sufficient size to afford a firm support of the car upon the truck, and to furnish a considerable bearing-surface for the plates to work upon each other. Upon the upper face of the plate B, which rests upon the truck-bolster, there are formed two concentric rings or ribs, as seen at *b* and *d*, and leaving a space between them, which forms the receptacle for the oil or lubricant that is used between the bearing-surfaces of the plates; and upon the bottom of said receptacle a circular rib or ring, cast upon the under side of the plate D, works, and thereby forms the bearing-surface for the body-bolster. This ring is shown at *d'*, and is not as thick as the width of the space between the two rings *b* and *d* upon the plate B; consequently a space is left on each side of the ring *d'* to contain the oil required for lubricating the bearing-surfaces. To prevent the dust and dirt from drifting into said oil-receptacle, a circular flange, as shown at *b'*, is formed upon the plate D, and it projects down around the outside of the ring *b* on the plate B, and thereby serves as a shield to obstruct the dust from drifting in between the plates B and D, and into the oil or lubricant that is placed in contact with the bearing-surfaces *d'* and the plate B. Upon said plates, and close around the king-bolt which passes through the center thereof, there are formed concentric rings or bosses, as shown at *e* and *e'*, the upper one of which works within the lower one, as shown in the drawings, and fits snugly therein, so as to prevent any lateral movement of the plates upon each other, and thereby prevents the rib $d'$ from vibrating in the oil-receptacle, which would, if not so prevented, soon throw the oil out of its proper position for lubricating the bearing-surfaces, and thereby destroy one of the great advantages of my invention, which is to allow the freest possible action of the truck under its load, in order that the curves of the road may be easily followed by the wheels.

I therefore claim—

1. In body-bolsters for railroad-cars, the combination and arrangement of the trusses F, center plate D, sills G, and tension rod or rods I, as described, and for the purposes set forth.

2. The combination of the bearing-plate B, having the flanges $d$ $b$, which form an oil-receptacle between them, with the bearing-plate D, having the flange $d'$, all substantially as and for the purpose set forth.

AMBROSE WARD.

Witnesses:

BOYD ELIOT,

E. N. ELIOT.